(12) United States Patent
Malkin et al.

(10) Patent No.: US 7,676,682 B2
(45) Date of Patent: Mar. 9, 2010

(54) LIGHTWEIGHT MANAGEMENT AND HIGH AVAILABILITY CONTROLLER

(75) Inventors: Kirill Malkin, Morris Plains, NJ (US); Oleg Neverovitch, Hillsborough, NJ (US)

(73) Assignee: Reldata, Inc., Parsippany, NJ (US)

( * ) Notice: Subject to any disclaimer, the term of this patent is extended or adjusted under 35 U.S.C. 154(b) by 633 days.

(21) Appl. No.: 11/470,548

(22) Filed: Sep. 6, 2006

(65) Prior Publication Data

US 2007/0130332 A1 Jun. 7, 2007

Related U.S. Application Data

(60) Provisional application No. 60/714,402, filed on Sep. 6, 2005.

(51) Int. Cl.
*G06F 1/00* (2006.01)
*G06F 13/00* (2006.01)
*G06F 13/36* (2006.01)

(52) U.S. Cl. .................. 713/300; 710/100; 710/312

(58) Field of Classification Search .................. 713/300
See application file for complete search history.

(56) References Cited

U.S. PATENT DOCUMENTS 5,525,890 A * 6/1996 Iwatsu et al. ................ 320/106
6,061,754 A * 5/2000 Cepulis et al. .............. 710/312
6,622,250 B1 * 9/2003 Castillo et al. .............. 713/300
6,910,964 B2 * 6/2005 Acres .......................... 463/25
6,996,463 B2 * 2/2006 Kondo ......................... 701/29
7,376,498 B2 * 5/2008 Sakurai et al. ................ 701/29

* cited by examiner

*Primary Examiner*—Suresh K Suryawanshi
(74) *Attorney, Agent, or Firm*—Wayne F. Reinke, Esq.; Heslin Rothenberg Farley & Mesiti P.C.

(57) ABSTRACT

A network storage appliance having a main computing unit is provided with an embedded microcomputer for monitoring startup and operation of the main computing unit. The microcomputer has the ability to restart, power down or power up the main computing unit if any corresponding predetermined conditions exist. Local nonvolatile storage holds the firmware for the main computing unit and configuration for the appliance. After loading the firmware and configuration to the main computing unit, the nonvolatile storage is electronically disconnected from the main computing unit. Where two such appliances are coupled for redundancy between the same network storage and the network, the embedded microcomputers are separately coupled for communication to allow for negotiating a restart of one of the main computing units under the direction of the other, or if any predetermined conditions occur.

24 Claims, 1 Drawing Sheet

LIGHTWEIGHT MANAGEMENT AND HIGH AVAILABILITY CONTROLLER

CROSS-REFERENCE TO RELATED APPLICATIONS

This application claims priority under 35 U.S.C. §119 to U.S. Provisional Application No. 60/714,402, filed Sep. 6, 2005, which is herein incorporated by reference in its entirety.

This application contains subject matter which is related to the subject matter of the following applications, each of which is assigned to the same assignee as this application and filed on the same day as this application. Each of the below listed applications is hereby incorporated herein by reference in its entirety:

U.S. patent application Ser. No. 11/470,551, by Kirill Malkin, entitled "STORAGE RESOURCE SCAN".

U.S. patent application Ser. No. 11/470,550, by Malkin et al., entitled "REDUNDANT APPLIANCE CONFIGURATION REPOSITORY IN STANDARD HIERARCHICAL FORMAT".

U.S. patent application Ser. No. 11/470,545, filed Sep. 6, 2006, by Kirill Malkin, entitled "BLOCK SNAPSHOTS OF iSCSI".

U.S. patent application Ser. No. 11/470,544, by Kirill Malkin, entitled "GENERATING DIGEST FOR BLOCK RANGE VIA iSCSI".

U.S. patent application Ser. No. 11/470,542, by Kirill Malkin, entitled "INCREMENTAL REPLICATION USING SNAPSHOTS".

U.S. patent application Ser. No. 11/470,537, by Kirill Malkin, entitled "PERFORMANCE IMPROVEMENT FOR BLOCK SPAN REPLICATION".

U.S. patent application Ser. No. 11/470,539, by Dmitry Fomichev, entitled "REUSING TASK OBJECT AND RESOURCES".

BACKGROUND OF THE INVENTION

1. Technical Field

The present invention generally relates to network storage appliances. More particularly, the present invention relates to reducing susceptibility of network storage appliance firmware and configuration to corruption, and resolving contention among redundant network storage appliances.

2. Background Information

Network storage has come a long way in terms of speed, availability and capacity. The high demands placed on network storage typically results in the need to provide storage services on a high availability basis. To achieve high availability, redundant network storage appliances can be used. In one such scenario, two storage appliances are coupled in parallel between the network storage and the network, so that if one of them goes down, the other takes over. As one skilled in the art will know, and except in some more complex scenarios, the two appliances should not provide the same service simultaneously, as that could lead to data corruption.

While redundant network storage appliances do provide high availability in most cases, if communication between the redundant appliances goes down, but the appliances themselves are still operational, there is no way for either of them to know that the other is still up. In that case, both will start providing service to the network for the same storage. This common clustering problem is known as "split brain." This condition can also result in the more complex scenarios noted above where simultaneous servicing is possible, since even in those situations, the appliances must still communicate and synchronize.

Another problem with network storage appliances is the susceptibility to corruption of the firmware and configuration from viruses, malware and other means.

Thus, a need exists for a way to resolve contention among redundant network storage appliances, and to reduce susceptibility to corruption of network storage appliance firmware and configuration.

SUMMARY OF THE INVENTION

Briefly, the present invention satisfies the need for a way to resolve contention among redundant network storage appliances by including embedded microcomputers that communicate with one another for monitoring startup and operation. Reduction of susceptibility to corruption is achieved by placing the appliance firmware and configuration in local nonvolatile storage and electronically disconnecting the nonvolatile storage after it is read during startup.

In accordance with the above, it is an object of the present invention to provide a way to resolve the condition known as "split brain" among redundant network storage appliances.

It is another object of the present invention to reduce the susceptibility to corruption of network storage appliance firmware and configuration.

The present invention provides, in a first aspect, a network storage system. The systems comprises a first network storage appliance, comprising a first main computing unit for managing network access to network storage when coupled thereto, and a first embedded microcomputer coupled to the first main computing unit for monitoring startup and operation of the first main computing unit, the first embedded microcomputer being adapted to perform at least one of restarting the first main computing unit if one or more first predetermined conditions exist, powering down the first main computing unit if one or more second predetermined conditions exist, and powering up the first main computing unit if one or more third predetermined conditions exist. The systems further comprises a second network storage appliance, comprising a second main computing unit for managing network access to network storage when coupled thereto, and a second embedded microcomputer coupled to the second main computing unit for monitoring startup and operation of the main computing unit, the second embedded microcomputer being adapted to perform at least one of restarting the second main computing unit if one or more fourth predetermined conditions exist, powering down the second main computing unit if one or more fifth predetermined conditions exist, and powering up the second main computing unit if one or more sixth predetermined conditions exist, the first embedded microcomputer and the second embedded microcomputer being coupled for communication therebetween and further adapted to negotiate one of a restart, power down and power up of one of the first main computing unit and the second main computing unit if one or more other predetermined conditions exist.

The present invention provides, in a second aspect, a network storage system. The system comprises a first network storage appliance, comprising a first main computing unit for managing network access to network storage when coupled thereto, and a first embedded microcomputer coupled to the first main computing unit for monitoring communications from the first main computing unit independent of a state of the first main computing unit and startup and operation of the first main computing unit, the first embedded microcomputer being adapted to perform restarting of the first main computing unit if the first embedded microcomputer detects a failure of communications from the first main computing unit.

The present invention provides, in a third aspect, a method of resolving contention between redundant network storage appliances. The method comprises providing a first network storage appliance and a second network storage appliance, each network storage appliance comprising a main computing unit for managing storage when coupled thereto, and an embedded microcomputer coupled to the main computing unit for monitoring startup and operation of the main computing unit, coupling the main computing units for communications therebetween, coupling the embedded microcomputers for communications therebetween, wherein communication between the embedded microcomputers is independent of a state of either main computing unit and negotiating one of a restart, power down and power up of one of the main computing units between the embedded microcomputers if one or more predetermined conditions exist.

The present invention provides, in another aspect, a method of and program product for reducing the possibility for corruption of firmware and configuration for a network storage appliance. The method comprises providing a network storage appliance, the network storage appliance comprising a main computing unit for managing network access to network storage when coupled thereto, an embedded microcomputer coupled to the main computing unit for monitoring communications from the main computing unit and startup and operation of the main computing unit, nonvolatile local storage coupled to the main computing unit for storing firmware for the main computing unit and a configuration for the network storage appliance, and protecting the firmware and the configuration stored on the nonvolatile local storage from corruption or undesired access by electronically decoupling the nonvolatile local storage from the main computing unit after loading of the firmware.

The present invention also provides system and program product aspects corresponding to the above-noted method aspects.

The present invention is particularly suitable for low-cost, highly flexible designs based on standard hardware. For example, the main computing unit could be an unaltered, standard PC motherboard with no support for high availability. The present invention introduces high availability features typically found in high-end equipment with expensive, proprietary hardware to this low-cost main computing unit.

These, and other objects, features and advantages of this invention will become apparent from the following detailed description of the various aspects of the invention taken in conjunction with the accompanying drawings.

DETAILED DESCRIPTION OF THE INVENTION

Figure 1:
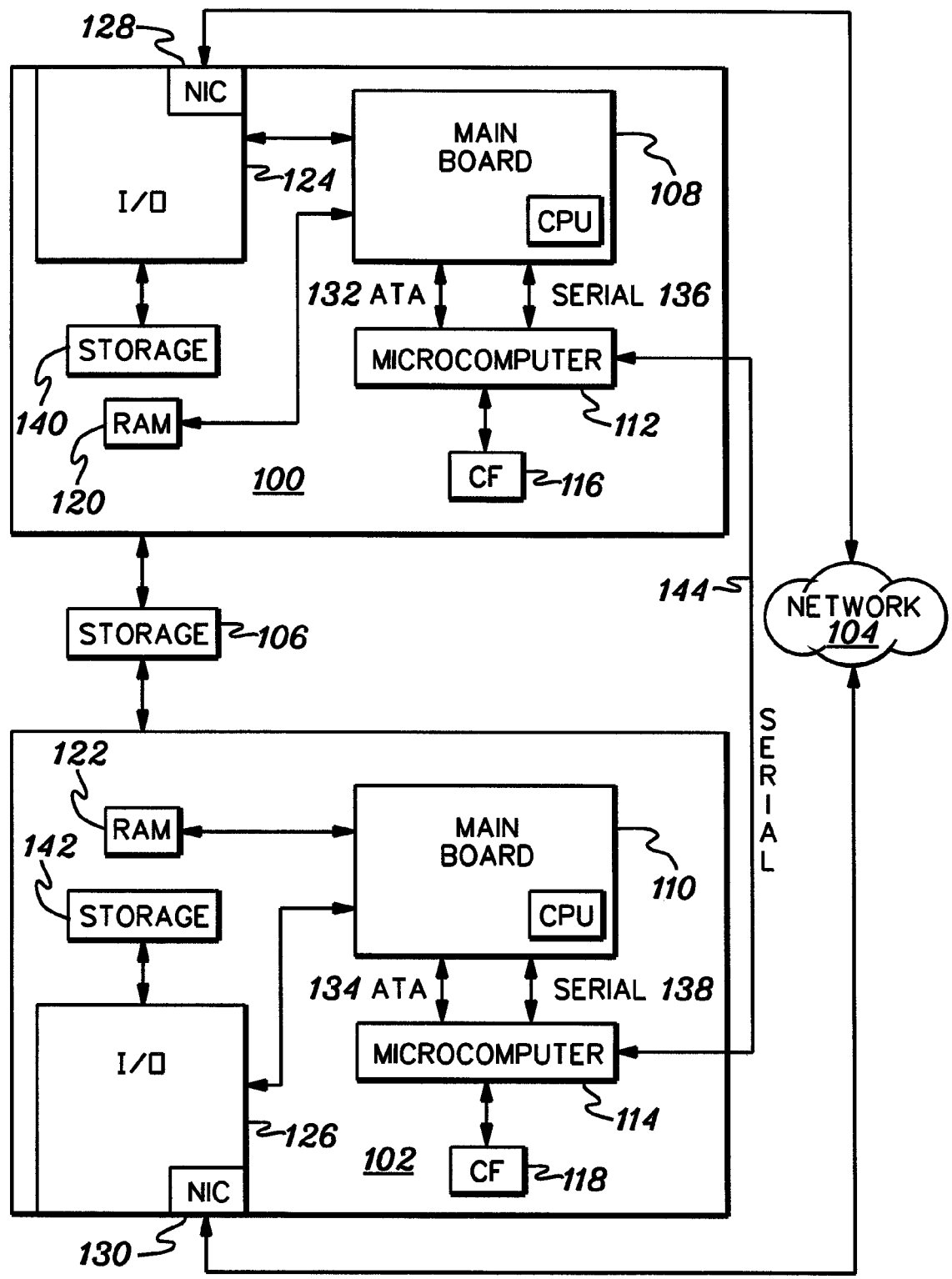
FIG. 1 is a simplified block diagram of two network storage appliances operating in accordance with the present invention.

FIG. 1 is a simplified block diagram of two redundant network storage appliances 100 and 102 situated between a network 104 and network storage 106. The appliances are arranged to provide high availability of the network storage to the network. For example, the appliances can be arranged in an active-passive configuration. Each appliance comprises a main computing unit board (108, 110), an embedded microcomputer (112, 114), local nonvolatile storage (116, 118, 140, 142), RAM (120, 122) and input/output means (124, 126). Local nonvolatile storage 116, 118 is coupled to the respective microcomputer. The appliances are coupled to the network by, for example, gigabit Ethernet via network interface cards (128, 130). The computing units and their respective microcomputers are coupled for communication by, for example, a high volume connection (132, 134; e.g., ATA, SATA or high-speed USB (i.e., USB 2.0)) for boot image transfer, and a low-volume connection (136, 138; e.g., serial or regular USB (i.e., USB 1.1)) for command and status information. In addition, the microcomputers are separately coupled for communication via serial or other low-volume connection 144. Of course, it will be understood that other connections between the microcomputers are possible, including via the network, other wired methods and wirelessly. As one skilled in the art will appreciate, there are additional components (e.g., one or more fans for cooling) that would also be part of such an appliance, the details of which are omitted here for the sake of brevity, and because they are not necessary to describe the aspects of the present invention.

The main computing unit provides the storage access service to the network, while the embedded microcomputer monitors startup and operation of the main computing unit. The main computing unit comprises a basic computer, i.e., main board including CPU(s), local storage (140, 142) and RAM (120, 122). The embedded microcomputer is preferably lightweight in comparison to a PC-class main board, meaning it is typically purpose-built, has a small footprint, consumes low power, and has little memory or components. The microcomputer runs a basic memory-based operating program. As such, the microcomputer boots fast (typically in 1-2 seconds), and begins monitoring BIOS (Basic Input/Output System) startup of the main computing unit, including POST (Power-On Self Test), after the firmware is loaded. The microcomputer may log the messages from the main computing unit during BIOS startup, and makes them available to an operator via the input/output means. As will be described in more detail below, the microcomputer has the ability to restart, power up or power down the main computing unit upon the occurrence of one or more predetermined conditions.

The input/output means comprises, for example, a touch screen, or a viewing screen (e.g., LCD or CRT, either monochrome or color) and a navigation/select mechanism (e.g., keyboard and mouse or other pointing device, or simple navigation/select buttons). As another example, the input/output means could be remote from the appliance, the input/output communicated over TCP/IP either wired or wirelessly.

The firmware for the main board, along with configuration for the appliance, is stored in local nonvolatile memory 116 and 118. The microcomputer provides electronic connectivity to the local nonvolatile storage for purposes of loading the firmware and configuration onto the main board via ATA connection 132 and 134. Preferably, the firmware and configuration are compressed and encrypted, and the main board decompresses and decrypts them before loading. Alternatively, the decompression and decryption could be accomplished by the microcomputer. Local nonvolatile memory 116 and 118 can each be, for example, a hard drive or some form of flash memory, such as, for example, compact flash or USB memory stick. After the BIOS has completed, software stored in local storage (140, 142) controlling the main computing unit boots and sets up the appliance in accordance with the configuration loaded from local nonvolatile memory. The software comprises an operating system, such as, for example, UNIX or a UNIX derivative, such as, for example, some form of LINUX, along with control software for providing the storage service.

In a typical embedded scenario, the local nonvolatile storage is directly connected to the main board, and is "visible" to the operating system and other software at all times. However, this increases the chances that whatever is stored on the nonvolatile local storage could be exposed to a virus, malware or other means of data corruption.

In accordance with one aspect of the present invention, the possibility of corruption of the firmware and configuration stored in local nonvolatile storage 116 and 118 is reduced by electronically disconnecting the storage from main boards 108 and 110. After the firmware and configuration are loaded to the main board, the operating system for the main board causes the microcomputer to electronically disconnect the local nonvolatile storage. The disconnection should be irreversible by the main board. In this way, the local nonvolatile storage will not be visible to the operating system or other software associated with the main board, and no corruption can flow from the main computing unit to the local nonvolatile storage after the disconnection. In one example, the connection to the local nonvolatile storage and the ATA connection to the main board is through a specially programmed integrated circuit (e.g., CPLD—Complex Programmable Logic Device) controlled by firmware in the microcomputer, which acts as a multilane switch with the ability to open or close connections. When the connection is opened, the main board cannot "see" the local nonvolatile storage.

During normal operation of the high availability configuration of FIG. 1, which in this example is active-passive, only one of the appliances would actively be providing network storage services to the network. In each appliance, the microcomputer merely monitors the main computing unit, sending, for example, heartbeat messages across the serial connection 136 and 138. Should the microcomputer discover that the main computing unit may not be functioning properly (e.g., no returned heartbeat message or other communication failure), the microcomputer has the ability to quickly shut the main computer down and restart with a command, known as an "electronic bullet." In general, the microcomputer has the ability to power down, power up or restart the main computing unit if predetermined conditions exist. Preferably, the conditions that lead to power down, power up and restart are different for each function.

Any number of conditions can be chosen in a given system to result in any of restart, power up or power down. Further, the power up and power down functions could be gradual, abrupt or normal. For example, the restart and power down functions could be used as last resorts when the main computing unit is deadlocked, network communications with it are down, or it is otherwise in some unknown state. The main computing unit could be gradually or normally powered down, for example, to get it into a known state, i.e., "down." If the gradual or normal power down does not succeed, i.e., the main computing unit remains in the unknown state, it could then be restarted. If the main computing unit comes up, but continues to be deadlocked, network communications with it continue to be unavailable, or it otherwise remains in an unknown state, then an abrupt power down request could be initiated. Such an action is sometimes referred to as STONITH, or "Shoot The Other Node In The Head," and is analogous to unplugging it. After any power down, it may be beneficial to power up the main computing unit after a predetermined time in the hope that the condition causing the problem has gone away. As another example, one or more main computing units could be powered down in a multi-unit network for load balancing purposes. Likewise, one or more computing units powered down could be powered up for load balancing.

The ability of the microcomputer to shut down and restart provides a very high likelihood of being able to restart the main computing unit. The decision to power down, power up, or restart the main computer is preferably made by firmware running on the other main computer, which then uses the communication between the microcomputers to arrange the course of action decided.

As noted above, in accordance with another aspect of the invention, the microcomputers of the two network storage appliances are coupled for separate communication between themselves via serial connection 144. The communication is not dependent on the state of either of the main computing units. The main computing units communicate with each other over the network. If that communication fails for any reason (e.g., an intermittent NIC problem or faulty cable), neither will know whether the other is down or providing storage access services. This situation is known as "split brain," and can easily lead to data corruption. For example, assume that appliance 100 is active and appliance 102 is passive. If a write to network storage 106 has been requested, it will sit in write-back cache in local storage 140 (and mirrored in storage 142) until actually written out to storage. If at this point, communication between the appliances fails, appliance 102 would begin providing service at the same time that appliance 100 is still operational. If appliance 102 writes the data in the write-cache to network storage 106, then a new write for same data is processed, and at the same time a request for that data goes to appliance 100, the requester would be provided with old data.

The ability of the microcomputers to communicate, coupled with their ability to power down, power up and restart their associated main computing unit, allows the microcomputers to negotiate a course of action for one of the main computing units under the direction of the other main computing unit. The connection between the main computing units and their respective microcomputers can be used by the main computing unit to inform the microcomputer that communications with the other main computing unit has failed. In general, the microcomputers can respond to possible contention among the appliances and negotiate a power down, power up or restart of one of the main computers. Of course, any of these actions can be in response to any predetermined condition that is monitored by the microcomputers, such as, for example, failure of the main computer to respond to a heartbeat message.

The above-described computing environment and/or computing units are only offered as examples. The present invention can be incorporated and used with many types of computing units, computers, processors, nodes, systems, work stations and/or environments without departing from the spirit of the present invention. Additionally, while some of the embodiments described herein are discussed in relation to certain high availability configurations, such embodiments are only examples. Other types of computing environments can benefit from the present invention and, thus, are considered a part of the present invention.

The present invention can include at least one program storage device readable by a machine, tangibly embodying at least one program of instructions executable by the machine to perform the capabilities of the present invention. The program storage device can be provided separately, or as a part of a computer system.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A network storage system, comprising:
 a first network storage appliance, comprising:
  a first main computing unit for managing network access to network storage when coupled thereto; and
  a first embedded microcomputer coupled to the first main computing unit for monitoring startup and operation of the first main computing unit, wherein the first embedded microcomputer is adapted to perform at least one of restarting the first main computing unit if one or more first predetermined conditions exist, powering down the first main computing unit if one or more second predetermined conditions exist, and powering up the first main computing unit if one or more third predetermined conditions exist;
 a second network storage appliance, comprising:
  a second main computing unit for managing network access to network storage when coupled thereto; and
  a second embedded microcomputer coupled to the second main computing unit for monitoring startup and operation of the main computing unit, wherein the second embedded microcomputer is adapted to perform at least one of restarting the second main computing unit if one or more fourth predetermined conditions exist, powering down the second main computing unit if one or more fifth predetermined conditions exist, and powering up the second main computing unit if one or more sixth predetermined conditions exist;
 wherein the first embedded microcomputer and the second embedded microcomputer are coupled for communication therebetween and further adapted to negotiate one of a restart, power down and power up of one of the first main computing unit and the second main computing unit if one or more other predetermined conditions exist.

2. The network storage system of claim 1, wherein the first, second and third predetermined conditions match the fourth, fifth and sixth predetermined conditions, respectively.

3. The network storage system of claim 1, wherein the one or more other predetermined conditions matches one of the one or more first, second, third, fourth, fifth or sixth predetermined conditions.

4. The network storage system of claim 1, wherein the first main computing unit and the second main computing unit are coupled for communications therebetween, and wherein the one or more other predetermined conditions comprises failure of communications between the first main computing unit and the second main computing unit.

5. The network storage system of claim 1, further comprising:
 first nonvolatile local storage coupled to the first main computing unit for storing firmware for the first main computing unit and a configuration for the first network storage appliance; and
 an integrated circuit for electronically decoupling the first nonvolatile local storage from the first main computing unit.

6. The network storage system of claim 5, wherein the first nonvolatile local storage is coupled to the first main computing unit through the first embedded microcomputer, and wherein the integrated circuit is coupled to and controlled by the first embedded microcomputer.

7. A method of resolving contention between redundant network storage appliances, the method comprising:
 providing a first network storage appliance and a second network storage appliance, each network storage appliance comprising:
  a main computing unit for managing storage when coupled thereto; and
  an embedded microcomputer coupled to the main computing unit for monitoring startup and operation of the main computing unit;
 coupling the main computing units for communications therebetween;
 coupling the embedded microcomputers for communications therebetween, wherein communication between the embedded microcomputers is independent of a state of either main computing unit; and
 negotiating one of a restart, power down and power up of one of the main computing units between the embedded microcomputers if one or more predetermined conditions exist.

8. The method of claim 7, wherein the one or more predetermined conditions comprises a communications failure between the main computing units.

9. The method of claim 7, wherein each of the microcomputers is also coupled to its corresponding main computing unit for communications therebetween, and wherein the one or more predetermined conditions comprises a communications failure between one of the microcomputers and its corresponding main computing unit.

10. At least one program storage device readable by a machine tangibly embodying at least one program of instructions executable by the machine to perform a method of resolving contention between redundant network storage appliances, the method comprising:
 providing a first network storage appliance and a second network storage appliance, each network storage appliance comprising:
  a main computing unit for managing storage when coupled thereto; and
  an embedded microcomputer coupled to the main computing unit for monitoring startup and operation of the main computing unit;
 coupling the main computing units for communications therebetween;
 coupling the embedded microcomputers for communications therebetween, wherein communication between the embedded microcomputers is independent of a state of either main computing unit; and
 negotiating one of a restart, power down and power up of one of the main computing units between the embedded microcomputers if one or more predetermined conditions exist.

11. The at least one program storage device of claim 10, wherein the one or more predetermined conditions comprises a communications failure between the main computing units.

12. The at least one program storage device of claim 10, wherein each of the microcomputers is also coupled to its corresponding main computing unit for communications therebetween, and wherein the one or more predetermined conditions comprises a communications failure between one of the microcomputers and its corresponding main computing unit.

13. A method of reducing possible corruption of firmware and configuration for a network storage appliance, the method comprising:
providing a network storage appliance, the network storage appliance comprising:
a main computing unit for managing network access to network storage when coupled thereto;
an embedded microcomputer coupled to the main computing unit for monitoring communications from the main computing unit and startup and operation of the main computing unit;
nonvolatile local storage coupled to the main computing unit for storing firmware for the main computing unit and a configuration for the network storage appliance; and
protecting the firmware and the configuration stored on the nonvolatile local storage from corruption or undesired access by electronically decoupling the nonvolatile local storage from the main computing unit after loading of the firmware.

14. The method of claim 13, wherein the nonvolatile local storage is coupled to the main computing unit through the embedded microcomputer, and wherein the electronically decoupling is controlled by the embedded microcomputer.

15. The method of claim 13, further comprising restarting the main computing unit if the embedded microcomputer detects a failure of communications from the main computing unit.

16. At least one program storage device readable by a machine tangibly embodying at least one program of instructions executable by the machine to perform a method of reducing possible corruption of firmware and configuration for a network storage appliance, the method comprising:
providing a network storage appliance, the network storage appliance comprising:
a main computing unit for managing network access to network storage when coupled thereto;
an embedded microcomputer coupled to the main computing unit for monitoring communications from the main computing unit and startup and operation of the main computing unit;
nonvolatile local storage coupled to the main computing unit for storing firmware for the main computing unit and a configuration for the network storage appliance; and
protecting the firmware and the configuration stored on the nonvolatile local storage from corruption or undesired access by electronically decoupling the nonvolatile local storage from the main computing unit after loading of the firmware.

17. The at least one program storage device of claim 16, wherein the nonvolatile local storage is coupled to the main computing unit through the embedded microcomputer, and wherein the electronically decoupling is controlled by the embedded microcomputer.

18. The at least one program storage device of claim 16, the method further comprising restarting the main computing unit if the embedded microcomputer detects a failure of communications from the main computing unit.

19. A network storage system, comprising:
a first network storage appliance, comprising:
a first main computing unit for managing network access to network storage when coupled thereto; and
a first embedded microcomputer coupled to the first main computing unit for monitoring communications from the first main computing unit independent of a state of the first main computing unit and startup and operation of the first main computing unit, wherein the first embedded microcomputer is adapted to perform restarting of the first main computing unit if the first embedded microcomputer detects a failure of communications from the first main computing unit.

20. The network storage system of claim 19, wherein the first main computing unit and the first embedded microcomputer are coupled for communications therebetween, and wherein the failure of communications comprises a failure to receive by the first embedded microcomputer a response to a message sent to the first main computing unit.

21. The network storage system of claim 19, further comprising:
a second network storage appliance, comprising:
a second main computing unit for managing network access to network storage when coupled thereto; and
a second embedded microcomputer coupled to the second main computing unit for monitoring communications from the first main computing unit independent of a state of the first main computing unit and startup and operation of the main computing unit, wherein the second embedded microcomputer is adapted to perform restarting of the second main computing unit if the first embedded microcomputer detects a failure of communications from the first main computing unit;
wherein the first embedded microcomputer and the second embedded microcomputer are coupled for communication therebetween independent of a state of either main computing unit, and wherein the first embedded microcomputer and the second embedded microcomputer are further adapted to negotiate restart of one of the first main computing unit and the second main computing unit.

22. The network storage system of claim 21, wherein the first main computing unit and the second main computing unit are coupled for communications therebetween, and wherein the failure of communications comprises failure of communications between the first main computing unit and the second main computing unit.

23. The network storage system of claim 19, further comprising:
first nonvolatile local storage coupled to the first main computing unit for storing firmware for the first main computing unit and a configuration for the first network storage appliance; and
an integrated circuit for electronically decoupling the first nonvolatile local storage from the first main computing unit.

24. The network storage system of claim 23, wherein the first nonvolatile local storage is coupled to the first main computing unit through the first embedded microcomputer, and wherein the integrated circuit is coupled to and controlled by the first embedded microcomputer.

* * * * *